United States Patent
Rodgers et al.

(10) Patent No.: US 9,531,677 B1
(45) Date of Patent: Dec. 27, 2016

(54) METHOD AND SYSTEM FOR MANAGING NETWORK ACCESS

(71) Applicant: Skyport Systems, Inc., Mountain View, CA (US)

(72) Inventors: Robert Stephen Rodgers, Mountain View, CA (US); William Norman Eatherton, San Jose, CA (US); Michael John Beesley, Atherton, CA (US); Stefan Alexander Dyckerhoff, Palo Alto, CA (US); Philippe Gilbert Lacroute, Sunnyvale, CA (US); Edward Ronald Swierk, Mountain View, CA (US); Neil Vincent Geraghty, San Francisco, CA (US); Keith Eric Holleman, Campbell, CA (US); Thomas John Giuli, Mountain View, CA (US); Srivatsan Rajagopal, Cupertino, CA (US); Paul Edward Fraley, Sunnyvale, CA (US); Vijay Krishnaji Tapaskar, Palo Alto, CA (US); Daniel Sergeevich Selifonov, Mountain View, CA (US); Keith Anthony Low, San Mateo, CA (US)

(73) Assignee: Skyport Systems, Inc., Mountain View, CA (US)

(*) Notice: Subject to any disclaimer, the term of this patent is extended or adjusted under 35 U.S.C. 154(b) by 0 days.

(21) Appl. No.: 14/705,679

(22) Filed: May 6, 2015

Related U.S. Application Data

(60) Provisional application No. 61/989,957, filed on May 7, 2014.

(51) Int. Cl.
| | | |
|---|---|---|
| H04L 29/06 | (2006.01) | |
| H04L 29/12 | (2006.01) | |
| G06F 9/455 | (2006.01) | |
| H04L 29/08 | (2006.01) | |

(52) U.S. Cl.
CPC ....... *H04L 63/0281* (2013.01); *G06F 9/45558* (2013.01); *H04L 61/1511* (2013.01); *H04L 61/2015* (2013.01); *H04L 63/20* (2013.01); *H04L 67/02* (2013.01); *G06F 2009/45595* (2013.01)

(58) Field of Classification Search
CPC  H04L 63/0281; H04L 61/1511; H04L 6/2015; H04L 63/20; H04L 67/02; G06F 9/45558
USPC .......................................... 726/1
See application file for complete search history.

(56) References Cited

U.S. PATENT DOCUMENTS

| | | | |
|---|---|---|---|
| 7,870,153 B2 | 1/2011 | Croft et al. | |
| 7,886,023 B1 * | 2/2011 | Johnson | H04L 67/1002 709/219 |
| 8,010,679 B2 | 8/2011 | Low et al. | |
| 8,051,180 B2 | 11/2011 | Mazzaferri et al. | |
| 8,438,654 B1 | 5/2013 | Von Eicken et al. | |

(Continued)

*Primary Examiner* — Michael S McNally
(74) *Attorney, Agent, or Firm* — Osha Liang LLP

(57) ABSTRACT

In general, embodiments of the invention relate to a method and system for managing network access for applications. More specifically, embodiments of the invention provide mock Internet Protocol (IP) addresses to the applications, where the applications may use the mock IP address to communicate with other systems. Each mock IP address may be associated with one or more policies, where the policies dictate how packets that include the mock IP address is processed.

20 Claims, 13 Drawing Sheets

(56) References Cited

U.S. PATENT DOCUMENTS

| | | | |
|---|---|---|---|
| 8,572,400 B2 | 10/2013 | Lin et al. | |
| 8,607,054 B2 | 12/2013 | Ramarathinam et al. | |
| 2010/0088405 A1* | 4/2010 | Huang | H04L 41/12 |
| | | | 709/224 |
| 2011/0162042 A1 | 6/2011 | Xiao et al. | |
| 2012/0151209 A1 | 6/2012 | Visnyak et al. | |
| 2013/0185715 A1 | 7/2013 | Dunning et al. | |
| 2013/0205376 A1 | 8/2013 | Narasimha et al. | |
| 2014/0281500 A1 | 9/2014 | Ignatchenko | |
| 2014/0344475 A1* | 11/2014 | Chen | H04L 61/2053 |
| | | | 709/245 |
| 2015/0007250 A1* | 1/2015 | Dicato, Jr. | G06F 21/50 |
| | | | 726/1 |
| 2015/0215308 A1 | 7/2015 | Manolov et al. | |
| 2016/0021055 A1* | 1/2016 | Krzywonos | H04L 61/1511 |
| | | | 709/245 |

* cited by examiner

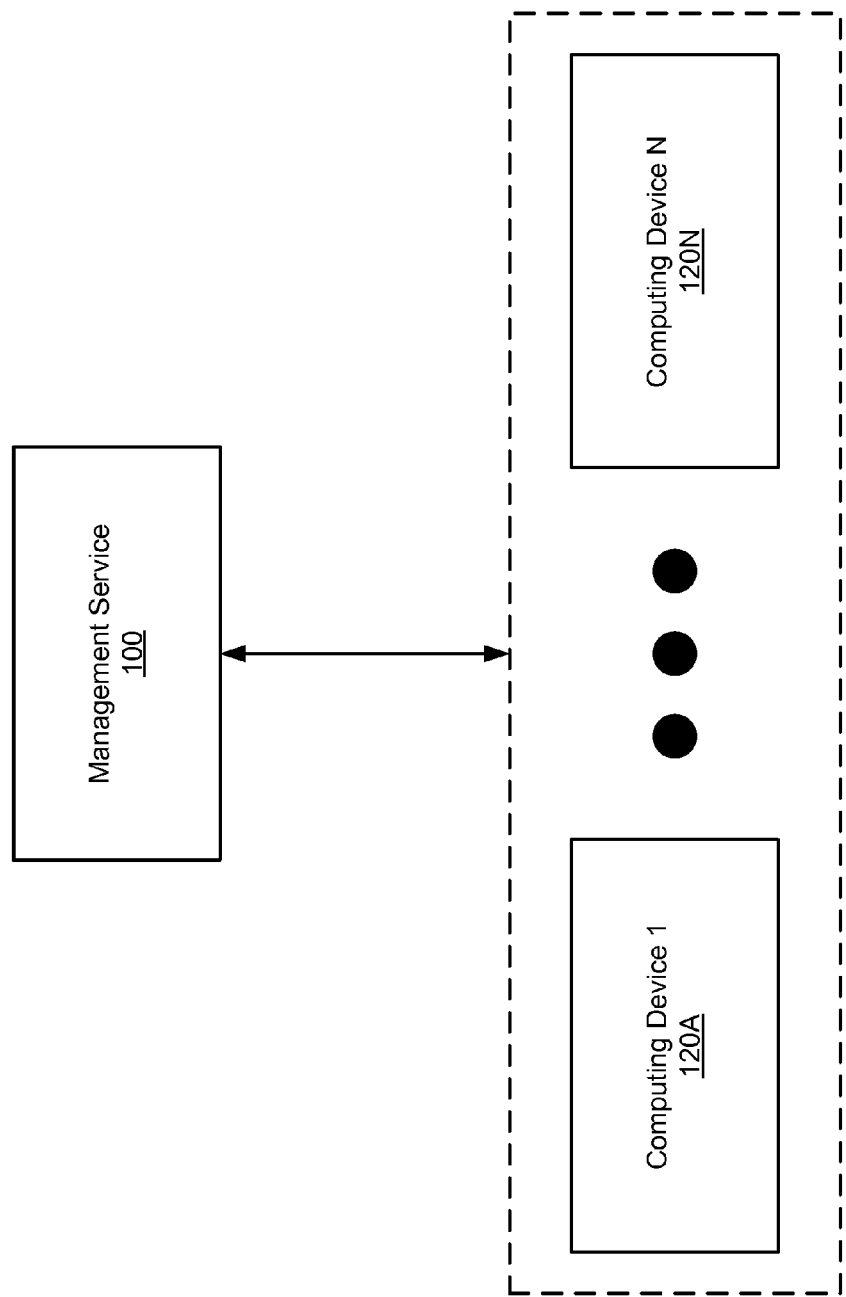

US 9,531,677 B1

METHOD AND SYSTEM FOR MANAGING NETWORK ACCESS

CROSS-REFERENCE TO RELATED APPLICATIONS

This application claims priority to U.S. Provisional Patent Application No. 61/989,957 filed May 7, 2014, the entire disclosure of which is hereby expressly incorporated by reference herein.

BACKGROUND

Applications may communicate with other systems via a network. If an application is compromised, the compromised application may be used compromise other systems on the network.

SUMMARY

In general, in one aspect, the invention relates to a method for managing network access for applications, comprising: issuing, by an application executing in an application virtual machine (AVM), a request for a domain name service (DNS) resolver to resolve a mock fully qualified domain name (FQDN), processing, by a DNS proxy executing in a service virtual machine (SVM), the request in order to obtain a mock Internet Protocol (IP) address, providing, by the DNS proxy, the mock IP address to the application, initiating, by the application, a connection to a remote host server using the mock IP address by issuing a packet comprising the mock IP address, receiving, by a network adaptor, the packet, obtaining, by the network adaptor, a first policy associated with the mock IP address, and processing, by the network adaptor, the packet based on the first policy, wherein the AVM, the SVM and the control domain execute on a computing device, wherein the computing device comprises the network adaptor.

In general, in one aspect, the invention relates to a method for managing network access for applications, comprising issuing, by the application executing in an application virtual machine (AVM), a request to a Dynamic Host Configuration Protocol (DHCP) server, receiving, by the application, in response to the request a universal resource locator (URL) for a proxy executing in a service virtual machine (SVM), connecting, by the application, to the proxy using the URL, after the connection has been established, providing a mock fully qualified domain name (FQDN) to the proxy, providing, by the proxy, the FQDN to a domain name service (DNS) resolver in a control domain, receiving, from the DNS resolver, a mock Internet Protocol (IP) address, initiating, by the proxy, a connection to a remote host server using the mock IP address by issuing a packet comprising the mock IP address, receiving, by a network adaptor, the packet, obtaining, by the network adaptor, a first policy associated with the mock IP address, and processing, by the network adaptor, the packet based on the first policy, wherein the AVM, the SVM and the control domain execute on a computing device, wherein the computing device comprises the network adaptor.

Other aspects of the invention will be apparent from the following description and the appended claims.

BRIEF DESCRIPTION OF DRAWINGS

FIGS. 1A-1C show systems in accordance with one or more embodiments of the invention.

DETAILED DESCRIPTION

Figure 1B:
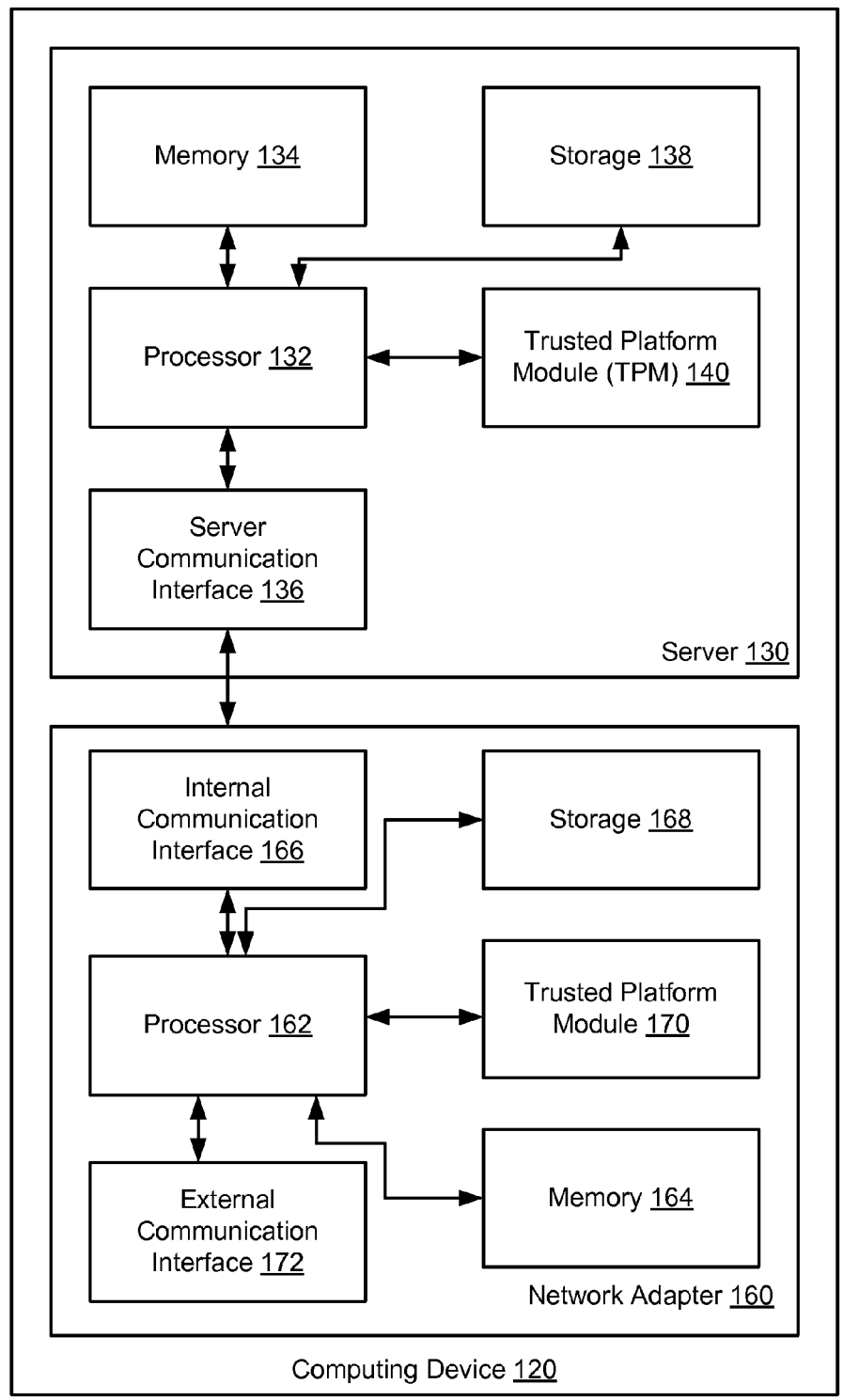

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-10, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing network access for applications. More specifically, embodiments of the invention provide mock Internet Protocol (IP) addresses to the applications, where the applications may use the mock IP address to communicate with other systems (e.g., other computing devices, the management service, or any other system that is accessible via the network). Each mock IP address may be associated with one or more policies, where the policies dictate how packets that include the mock IP address is processed. The use of mock IP addresses by the application instead of the actual IP address of the system with which the application is communicating may also provide an extra layer of abstraction. Said another way, if the application is compromised by an attacker, the attacker may not be able to obtain information from that application that would allow the attacker to access the systems with which the application was communicating and deprives a would-be attacker of useful reconnaissance information. Further, embodiments of the invention may require that a DNS resolution occurs using the particular DNS proxy in the SVM (described below) before the packets are issued by the application. Accordingly, attempts to transmit packets without first performing the DNS resolution using the specific DNS proxy will not be permitted. In addition, in various embodiments of the invention, the use of mock IP addresses may enable the computing device to hide with whom the application is connecting and any information related to the connection. In one embodiment of the invention, the mock IP address may be same as the actual IP address of the remote host server. In such scenarios, the use of the mock IP address may allow for the transparent application of a policy to the packets issued by the application.

FIG. 1A shows a system in accordance with one or more embodiments of the invention. The system includes computing devices (120A-120N) (described, e.g., in FIGS. 1B-1C) operatively connected to a management service (100). In one embodiment of the invention, the management service (100) is any combination of hardware and software that includes functionality to manage one or more computing devices. More specifically, the management service (100) may include one or more servers (each including at least a processor, memory, persistent storage, and a communication interface) executing one or more applications (not shown) that include functionality to manage the computing devices (120A, 120N). The management of the computing devices by the management service may include, but is not limited to, functionality to: configure the computing device, modify the configuration (or operation of) the computing device, verify the integrity of the computing devices (i.e., to determine whether there has been any tampering (of the software and/or hardware) of the computing device), receive data from and/or provide data to the computing devices, provide applications to the computing device, and provide functionality to implement various methods described below (see e.g., FIGS. 6-7B and 9).

The management service may communicate with the computing device(s) using any combination of wired and/or wireless communication protocols. Further, the management service may communicate with the management service via a local area network (e.g., an enterprise network, and/or wide area network (e.g., over the Internet)). The communication between the management service and the computing devices may include any combination of secured (e.g., encrypted) and non-secure (e.g., un-encrypted) communication channels. In one or more embodiments of the invention, secure communication is ensured, even in case of a non-secure communication channel. The manner in which the management service and the computing devices communicate may vary based on the implementation of the invention.

In one embodiment of the invention, the computing devices (120A, 120N) may be located within an enterprise. More specifically, the computing devices may be on an enterprise network (i.e., behind the enterprise's firewall).

The management service and one or more of the computing devices may be located in the same physical location (e.g., in the same data center). Alternatively, the management service and one or more of the computing devices may be located in different physical locations. The physical locations of the management service and the computing devices may vary based on the implementation.

As discussed above, the management service includes functionality to verify the integrity of the computing devices. The aforementioned verification may be performed whenever the computing device is powered on, restarted, etc. and at any other point at which the management service determines it is necessary (e.g., based on a policy implemented by the management service) to verify the integrity of the computing device.

The following is an example of the integrity verification performed by the management service when a computing device is powered on. The example is not intended to limit the invention. Turning to the example, consider a scenario in which a computing device is configured and then subsequently shipped to a user to be installed into their enterprise network. Once the computing device has been installed in the enterprise network, the computing device is powered on and the integrity verification for the computing device is initiated. In this example, through the integrity verification processes, the computing device needs to provide to the management service serial numbers (or other identification numbers) for one or more hardware components (see e.g., FIG. 1B) in the computing device) and perform a series of integrity measurements of the software that is present on the computing device (e.g., the BIOS, executable code in the ROM, platform and motherboard configuration data, operating system software, virtualization software, applications, etc.). In one embodiment of the invention, each of the integrity measurements is a cryptographic hash (e.g., SHA-256 hash) of the software being measured. The integrity measurements may be obtained in accordance with one or more Trusted Computing Group Trusted Platform Module specifications. Other methods for performing integrity measurements may be implemented without departing from the invention.

Returning to the example, once the serial numbers and the integrity measurements are provided to the management service, the management service verifies the aforementioned information. If the verification is successful, then the integrity of the computing device has been verified. At this point, the management service may permit the computing device to complete the boot process. More specifically, in one embodiment of the invention, the computing device's functionality may be limited until its integrity has been successfully verified. Accordingly, prior to successful verification, the computing device may only perform the functions that are required to enable its integrity verification. All other functionality may be disabled, e.g., the computing device cannot execute any other operating system or applications, the computing device cannot communicate with any other remote system except the management service, etc.

Continuing with the discussion of FIG. 1A, in one embodiment of the invention, each of the computing devices includes functionality to execute one or more applications (discussed below, see e.g., FIG. 1C). Further, each of the computing devices may include functionality to interact with other computing devices, the management service, and/or other systems (i.e., systems that are operatively connected to the computing device).

FIG. 1B shows a system in accordance with one or more embodiments of the invention. In one or more embodiments of the invention, computing device (120) includes two components: a server (130) and a network adapter (160). Each of these components is described below.

Figure 1C:
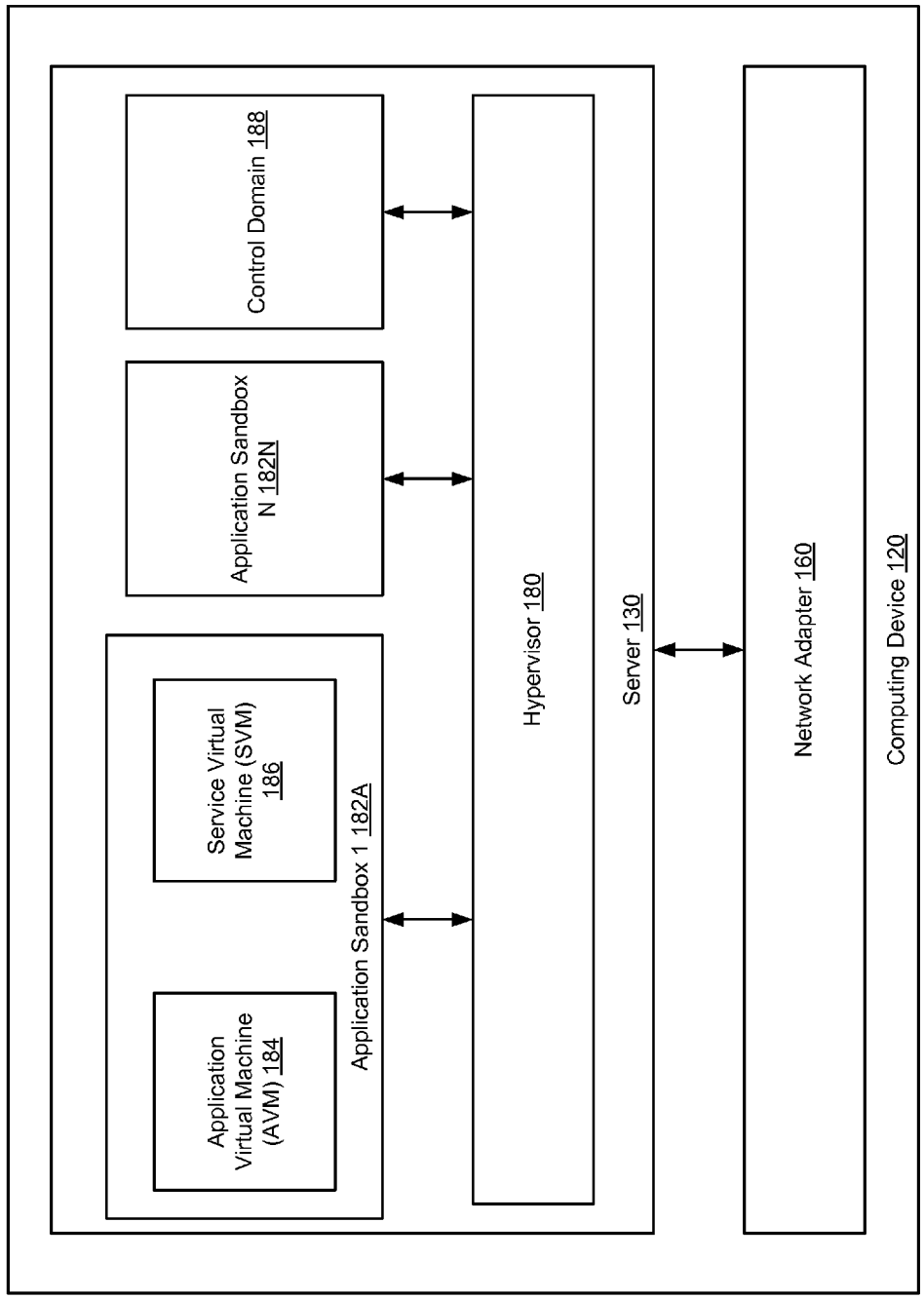

In one embodiment of the invention, the server (130) may include functionality to execute applications, virtual machines, and one or more operating systems (see e.g., FIG. 1C). The server (130) may include a processor (132), memory (134), a server communication interface (136), storage (138), and a trusted platform module (140). Each of these components is described below.

In one embodiment of the invention, the processor (132) is a group of electronic circuits with a single core or multi-cores that are configured to execute instructions. In one embodiment of the invention, the processor may be implemented using a Complex Instruction Set (CISC) Architecture or a Reduced Instruction Set (RISC) Architecture In one embodiment of the invention, the memory (134) corresponds to any volatile memory including, but not limited to, Dynamic Random-Access Memory (DRAM), Synchronous DRAM, SDR SDRAM, and DDR SDRAM.

In one embodiment of the invention, the server communication interface (136) enables communication between the server (130) and the network adapter (160). The server communication interface may provide the only path through which the server and the network adapter may communicate. Accordingly, the server may not directly access any other component of the network adapter (160). The server communication interface (136) may use any of the following protocols to communicate with the network adapter: Peripheral Component Interconnect (PCI), PCI-Express (PCIe), and PCI-eXtended (PCI-X), Non-Volatile Memory Express (NVMe). Those skilled in the art will appreciate that the invention is not limited to the aforementioned protocols.

In one embodiment of the invention, the storage (138) corresponds to any persistent (non-volatile storage). The storage (138) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one embodiment of the invention, the trusted platform module (140) (which may also be referred to as hardware security module) is a microprocessor that includes a cryptographic processor, a secure input/output (IO) interface, persistent memory (which may store various cryptographic keys), and volatile memory (which may store integrity measurements and cryptographic keys). In one embodiment of the invention, the cryptographic processor may include functionality to encrypt and decrypt data, generate random numbers, generate cryptographic keys (e.g., public-private key pairs, symmetric keys, etc.), and generate hash values (e.g., using SHA-256). The trusted platform module may be implemented in a manner that conforms to one or more Trusted Computing Group Trusted Platform Module specifications.

In one embodiment of the invention, the network adapter (160) includes functionality to control and/or provide network access between the server and other entities that are external to the computing device (e.g., other computing devices, the management services, and other systems (described above)). The network adapter may also include functionality to control the server's hardware resets and boot behavior. The network adapter (160) may include a processor (162), memory (164), an internal communication interface (166), storage (168), a trusted platform module (170), and an external communication interface (172). Each of these components is described below.

In one embodiment of the invention, the processor (162) is a group of electronic circuits with a single core or multi-cores that are configured to execute instructions. In one embodiment of the invention, the processor may be implemented using a Complex Instruction Set (CISC) Architecture or a Reduced Instruction Set (RISC) Architecture In one embodiment of the invention, the memory (164) corresponds any volatile memory including, but not limited to, Dynamic Random-Access Memory (DRAM), Synchronous DRAM, SDR SDRAM, and DDR SDRAM.

In one embodiment of the invention, the internal communication interface (166) enables communication between the server (130) and the network adapter (160). The internal communication interface may provide the only path through which the server and the network adapter may communicate. Accordingly, all communication from the server (130) and to the server (130) passes through the internal communication interface (166) The internal communication interface (166) may use any of the following protocols to communicate with the network adapter: Peripheral Component Interconnect (PCI), PCI-Express (PCIe), and PCI-eXtended (PCI-X), Non-Volatile Memory Express (NVMe). Those skilled in the art will appreciate that the invention is not limited to the aforementioned protocols.

In one embodiment of the invention, the storage (168) corresponds to any persistent (non-volatile storage). The storage (168) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one embodiment of the invention, the trusted platform module (170) (which may also be referred to as hardware security module) is the same or substantially similar to the TPM (140) described above.

In one embodiment of the invention, the external communication interface (172) enables the computing device (120) to communicate with the management service, other computing devices, or other systems (described above). The external communication interface may be implemented in accordance with the Ethernet standard (i.e., the external communication interface may include one or more Ethernet ports). Other communication standards may be used without departing from the invention.

In one embodiment of the invention, the network adapter (160) may include functionality to implement various secure communication protocols such as Internet Protocol Security (IPSec), Secure Sockets Layer (SSL), and Transport Layer Security (TLS). Further, the network adapter (160) may include functionality to perform various cryptographic functions on behalf of the server (or processes executing therein). For example, the network adapter (160) may include one or more FPGAs, one or more ASICs, etc. that that may be used to perform encryption and decryption functions on behalf of the processes executing in the server.

As discussed above, the computing devices include functionality to obtain integrity measurements that are used by the management service in order to verify the integrity of the computing device. In one embodiment of the invention, the server (using TPM (150)) and the network adapter (using TPM (170)) are each responsible for obtaining integrity measurements for the software executing therein. The management service, upon receiving the aforementioned measurements, may then verify the integrity of the server and network adapter independently. Further, the management service may only permit applications and virtual machines to execute on the computing devices if both the integrity of the server (130) and the integrity of the network adapter (160) have been verified. In certain scenarios, if the integrity of either the network adapter or the server cannot be verified, then the computing device may cease operating (or initiate some other remedial action).

In one embodiment of the invention, the network adapter may limit the server's use of the external communication interface (172) until the server's integrity has been verified. In such scenarios, the server (130) may only be able to access the management service via the external communication interface until the integrity of the server has been verified.

FIG. 1C shows a logical view of the computing device in accordance with one or more embodiments of invention. As shown in FIG. 1C and previously discussed, the computing device includes a server (130) and a network adapter (160). Further, the server (130) may have thereon one or more of the following components: a hypervisor (180), a control domain (188), and one or more application sandboxes (182A, 182N). Each of these components is described below.

In one embodiment of the invention, the control domain (188) is a virtual machine that includes an operating system (e.g., Security-Enhanced Linux). The control domain provides an isolated execution environment for processes/services executing within the control domain. The control domain (via the services executing therein) manages other virtual machines (discussed above) executing on the server (130). Management of the virtual machines may include, but is not limited to, instantiating virtual machines, halting execution of virtual machines on the server, providing various services to virtual machines (e.g., key management, backend processing of various protocol proxies executing in the service virtual machines (discussed below), etc.), and obtaining and enforcing policies related to the operation of the virtual machines in one or more application sandboxes.

In one embodiment of the invention, an application sandbox (182A, 182) includes one or more service virtual machines (SVM) (186) and one or more application virtual machines (AVMs) (184). Each of the SVMs and the AVMs is an isolated executing environment that includes its own operating system (e.g., Linux, Security-Enhanced Linux, or Windows). In embodiment of the invention, each AVM is associated with one SVM but each SVM may be associated with multiple AVMs. Each AVM includes functionality to execute one or more applications (including 3$^{rd}$ party applications). In one embodiment of the invention, the applications and/or processes executing within the AVM are only able to directly communicate with the associated SVM. The SVM may, based on one or more policies, permit the applications and/or processes within the AVM to access resources (software resources and/or hardware resources) in the server and/or the network adapter. In other embodiments of the invention, certain applications and/or processes in the AVM may (in certain scenarios) directly access resources in the server and/or network adapter. In such cases, the system may implement a policy which dictates when the applications/processes in an AVM can directly access the resources in the server and/or the network adapter and when the applications/processes are required to communicate with the SVM, which in turn communicates with the resources on the server and/or network adapter.

Continuing with the discussion of FIG. 1C, the SVM includes functionality to provide various services to the associated AVMs. These services may include, but are not limited to, various network services such as DHCP, ARP, DNS, and various file system services (i.e., services to access data that is external to the AVM). The services provided by the SVM to the AVM may be implemented as proxy services within the SVM. More specifically, from the perspective of the AVM, the proxy services provided by the SVM are the actual services. However, the proxy services provided by the SVM may be modified versions of the actual services, where the modification to the actual services may include modifications that limit access to the actual services or change the behavior of the actual services. In one embodiment of the invention, the control domain may perform various levels of processing to assist the SVM in implementing one or more proxy services. For example, in certain scenarios the proxy service is completely implemented in the SVM while in other scenarios a portion of the proxy service is implemented in the SVM while another portion of the proxy service is implemented in the control domain. Additional details about the various proxy services are provided below (see e.g., FIG. 4).

In one embodiment of the invention, the hypervisor (180) provides the interface between the hardware resources on the server (see e.g., FIG. 1B) and the virtual machines (e.g., control domain, SVMs, AVMs, etc.) executing on the server. The hypervisor executing on the server (130) may be, for example, a Xen hypervisor, a kernel-based virtual machine (KVM), or VMware ESXi.

Figure 2:
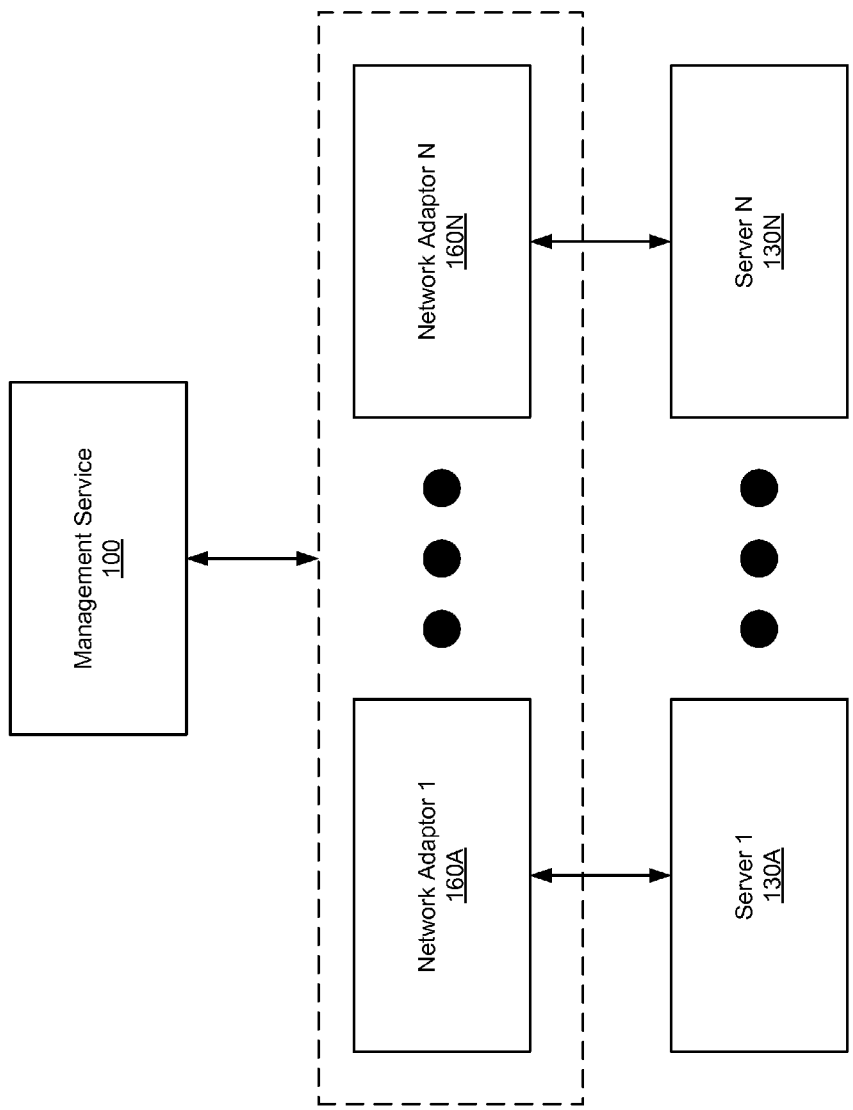
FIG. 2 shows a system in accordance with one or more embodiments of the invention.

FIG. 2 shows an alternate configuration of the system in accordance with one or more embodiments of the invention. In the system shown in FIG. 2, the servers (130A, 130B) and the network adapters (160A, 160B) are physically separate components as opposed to two components located within a single physical system (i.e., in computing device (120)).

Figure 3:
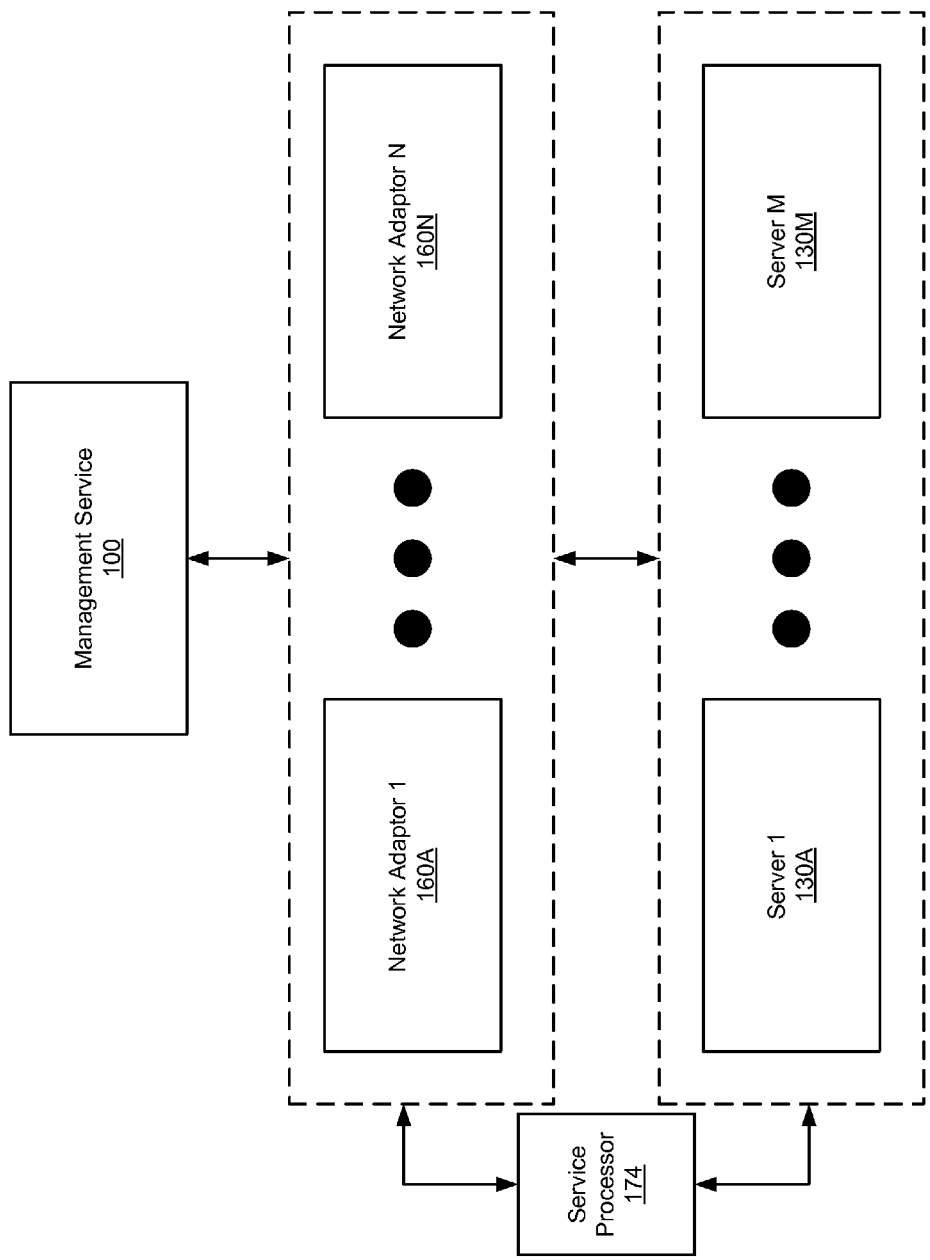
FIG. 3 shows a system in accordance with one or more embodiments of the invention.

FIG. 3 shows an alternate configuration of the system in accordance with one or more embodiments of the invention. In the system shown in FIG. 3, the servers (130A, 130M) and the network adapters (160A, 160N) are physically separate components as opposed to two components located within a single physical system (i.e., in computing device (120)). Further, instead of a 1:1 relationship between servers and network adapters, there may be n:1 relationship between servers and network adapters. In certain scenarios, a single server may be associated with multiple network adapters. The server(s) and the network adapter(s) may be connected via a switching fabric (176). The switching fabric (176) may directly connect the server(s) with the network adapter(s), or it may include network devices (e.g., routers and/or switches) that establish indirect connections between the server(s) and the network adapter(s). In one embodiment of the invention, a service processor (174) may be used to manage the interaction and/mapping between the servers and network adapters i.e., the service processor (174) may assign network adapters (160A-160N) to servers (130A-130N), for example, based on availability, bandwidth and redundancy considerations.

In one embodiment of the invention, the system described in FIGS. 1A-3 above may include an application running in an application virtual machine (AVM) (184) that needs to interact with other applications or services that are located elsewhere. FIGS. 4-10 describe various embodiments of the invention that enable applications within an AVM to interaction with applications or services external to the AVM.

Figure 4:
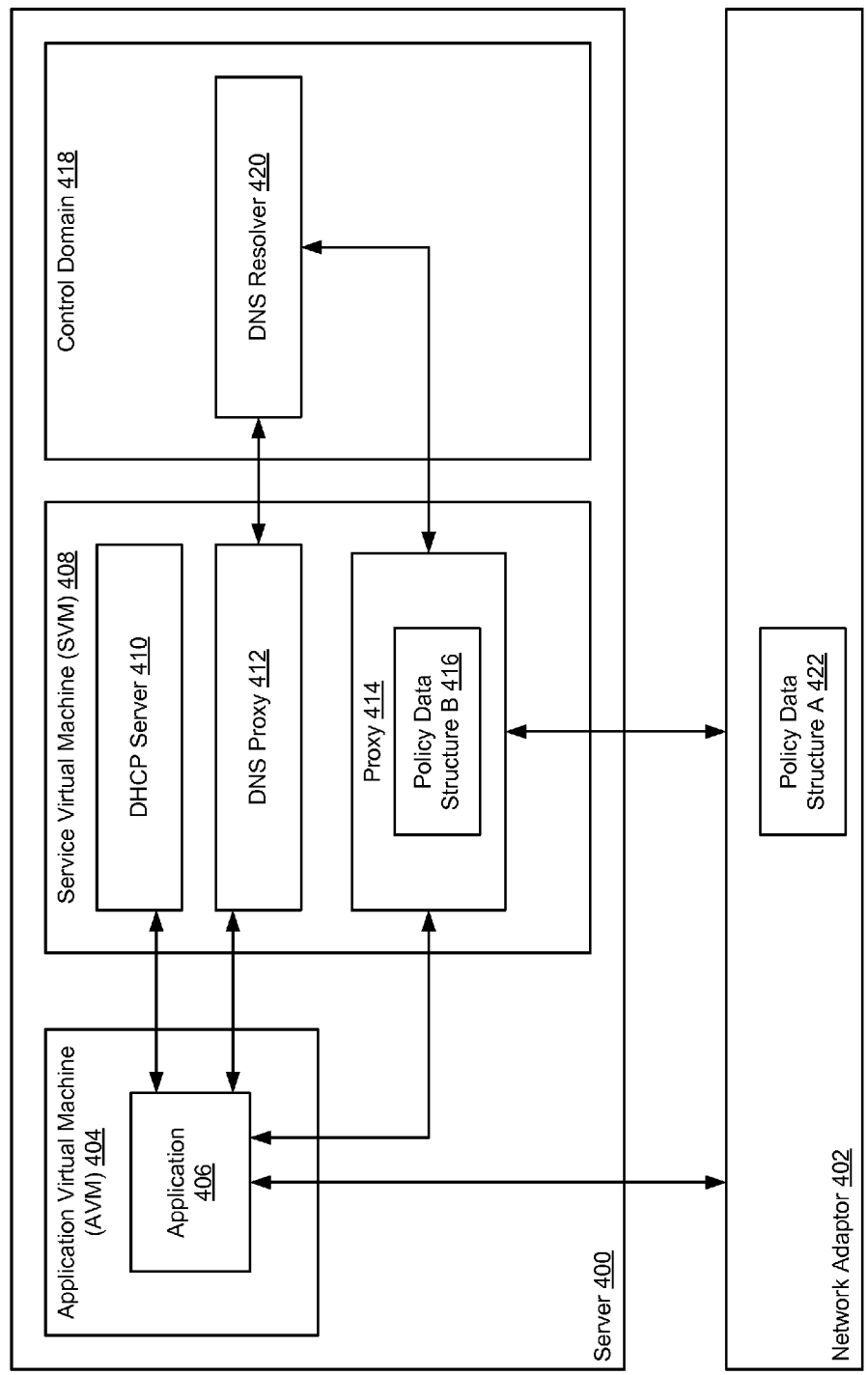
FIG. 4 shows a system in accordance with one or more embodiments of the invention.

FIG. 4 shows various components of the system previously described in FIGS. 1A-3 that may be used to manage network access for applications in an AVM. Other components of the system (while present) are omitted from FIG. 4 for purposes of clarity.

Turning to FIG. 4, in one embodiment of the invention, the computing device (or more specifically components executed therein) is configured such that the application (406) in the AVM (404) may only communicate with a select number of components that are external to the AVM (404). For example, the application (406) may communicate with certain components in the SVM (408) and the application (406) may also communicate with the network adaptor (402). However, the application may not directly communicate with the control domain (or any components executing therein). With respect to the application's communication with processes executing in SVM, the application may be configured such that its communication is limited to interacting with the DHCP server (410), the domain name service (DNS) proxy (412), and one or more proxies (414).

In one embodiment of the invention, the Dynamic Host Configuration Protocol (DHCP) server (410) executes in the SVM and implements DHCP. In particular, the DHCP server may provide an IP address to the AVM, where the IP address is used as a source IP address in packets transmitted from the AVM. The DHCP server may including functionality to provide the AVM (or applications executing therein) the IP address of the DNS proxy (412) (see e.g., FIG. 6). In addition, the DHCP server may also implement web proxy auto-discovery protocol (WPAD) (see e.g., FIG. 9).

In one embodiment of the invention, the DNS proxy (412) appears to the application as a DNS resolver (i.e., a service that resolves a fully qualified domain name (FQDN) to an IP address). However, the DNS proxy (412) does not include functionality to resolve FQDNs; rather, the DNS proxy (412) serves as an intermediary between the application and the DNS resolver (420) in the control domain.

In one embodiment of the invention, the DNS resolver (420) includes functionality to resolve FQDNs to corresponding IP addresses. The IP address that the DNS resolver provides to the DNS proxy may be a mock IP address (see e.g., FIGS. 5 and 7A). In one embodiment of the invention, the mock IP address is an IP address that conforms to Internet Protocol version 4 (IPv4) or IP version 6 (IPv6). However, the mock IP address is used to determine how to process packets that include the mock IP address as the destination IP address in the IP header of the packet (see e.g., FIGS. 6-7B). The DNS resolver may also include functionality to: (i) trigger the identification/selection of a mock IP address and (ii) trigger the population of one or more policy data structures (416, 422) (see e.g., FIG. 7, 706).

In one embodiment of the invention, populating the policy data structure(s) may include generating an entry, where the entry includes a mock IP address and a policy. The entry, once generated by the control domain, is provided to the network adaptor or the appropriate component in the SVM. The mock IP address may be selected from a pool (or set) of available IP addresses, may be specified by the management service, and/or specified by a user. The mock IP addresses may be selected in such a manner as to ensure that they do not conflict with other IP addresses that are used in the computing device.

In one embodiment of the invention, the number of entries generated by the control domain and the placement of the entries may vary based on the manner in which the packets from the application are to be processed. For example, if the mock IP address is only used to abstract the actual IP address of the remote host server with which the application is attempting to connect such that application is not aware of the actual IP address of the host server, then a single entry may be created and stored in a policy data structure (422) in the network adaptor (402). The single entry may be indexed using the mock IP address and may include a policy that specifies that the mock IP address in the packet should be replaced with an IP address included in the policy (i.e., the IP address of the remote host server). An example of how packets may be processed using multiple entries in accordance with one or more embodiments of the invention is provided below in FIG. 8.

Continuing with the discussion of FIG. 4, as discussed above, the SVM may include proxies (414) (also referred to as proxy services). In certain instances the processing of the packets issued by the AVM may need to be processed (based on the policy being applied to the packets) by a proxy. In certain embodiment of the invention, the use of the proxy to process packets issued by the AVM is transparent to AVM (i.e., the AVM and/or applications executing therein are not aware that a proxy is being used) (see e.g., FIGS. 6-8). In other embodiments of the invention, the application (or AVM) is able to directly connect to the proxy (414) (see e.g., FIGS. 9-10). In such scenarios, the proxy is not transparent to the AVM (or application executing therein). Depending on the implementation of the invention, the proxy (414) may also include functionality to communicate to the DNS resolver in the control domain in order to obtain a mock IP address. The proxy's interaction with the DNS resolver may be performed in a manner that is transparent to the AVM (and/or applications executing therein).

In one or more embodiments of the invention, the policies included within the entries may include any level of complexity. Further, a policy may be dependent on a number of factors including the state of the computing device (and/or the state of a component executing therein or located therein). The following describes some exemplary policies that may be included within the computing device. The examples are not intended to limit the scope of the invention. Example policies: replace the mock IP address in the packet with an actual IP address; limit bandwidth utilization of an application (or AVM) based on the source IP address of the packet; require packets with a given mock IP address to be further processed by a proxy in the SVM (see e.g., FIG. 8); limit the number of connections to a particular IP address (es); impose time of day on reachability of a particular destination IP address(es) or FQDNs (which may be associated with one or more mock FQDNs); merge multiple connections to an IP address(es) into a single pipelined connection using multiplexing; direct packets that match a specific criteria to a traffic inspection engine or to another location (e.g., a honey pot); mirror packet and send copy of packet to another location for storage; filter packet based on payload content (and optionally rewrite payload content); require use of a certain encryption algorithm (or cryptographic suite) be applied to the packet (or a portion thereof), and/or ban use of a certain encryption algorithm (or cryptographic suite) be applied to the packet (or a portion thereof).

Figure 5:
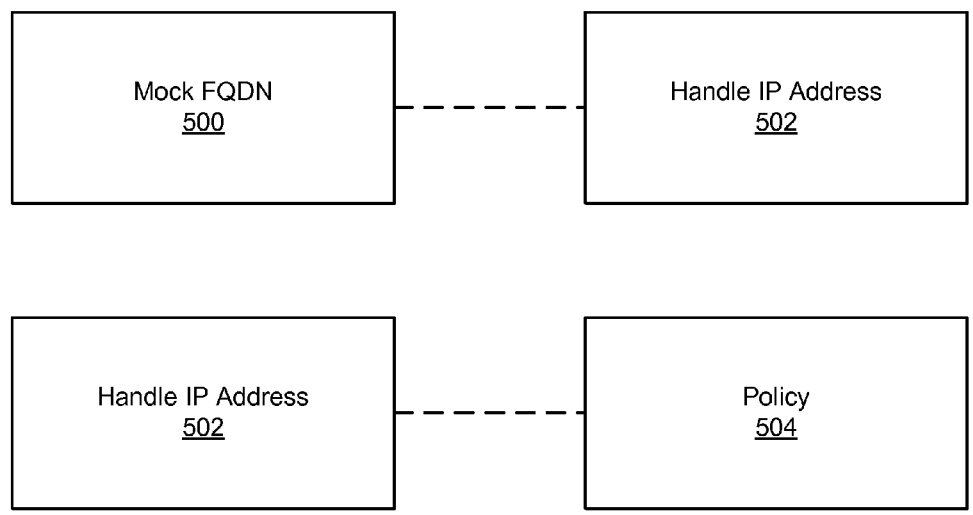
FIG. 5 shows relationships between various components in the system in accordance with one or more embodiments of the invention.

FIG. 5 shows relationships between various components in the system in accordance with one or more embodiments of the invention. In one embodiment of the invention, the application may attempt to contact a remote host server using a pre-configured mock FQDN. From the perspective of the application (FIG. 4, 406), the mock FQDN appears to be the FQDN for the remote host server that the application is attempting to contact. However, the mock FQDN is used, at least in part, in order to determine the mock IP address that is generated by the control domain and then ultimately provided to the application. For example, the mock FQDN may be application.secure_system.com and where the FQDN for the remote host server is actually foo.com. The use of the mock FQDN limits the information that the application knows about the remote host server to which the application is attempting to connect. The application is unable to determine that the mock FQDN is not the actual FQDN for the remote host server. In one embodiment of the invention, a single FQDN may be associated with multiple mock FQDNs. In such scenarios, different policies may be applied to packets destined for the same remote host server based on which mock FQDN was used to connect to the remote host server.

In one embodiment of the invention, the DNS resolver (or another process in the control domain or in the management service) associates the mock FQDN with a mock IP address. The mock FQDN (500)—mock IP address (502) mapping may be statically set. Alternatively, when the mock FQDN is received by the DNS resolver (or another process in the control domain or in the management service), the mock IP address is dynamically selected from a pool of mock IP addresses. Alternatively, the mock IP address may be dynamically generated. In one embodiment of the invention, the management service may provide the mock FQDN to the application. Further, the MOCK FQDN may be used to identify a particular application (e.g., mock FQDN is application_Lsecure_systems.com) and or to identify a type of application (e.g., mock FQND is database_app.secure_systems.com).

In one embodiment of the invention, each of the mock IP addresses (502) is associated with a policy (504). The policy may be of arbitrary complexity. Further, the mock IP address (502)—policy (504) mapping may be statically defined or it may be dynamically created. For example, the DNS resolver (or another process in the control domain or in the management service) may have a set of possible policies that may be mapped to the mock IP address and the selection of the particular policy may be determined at runtime based, in part, on the mock FQDN and on the current state of the computing device (or the current state of a component located in or executing therein). The following are examples of state information that may be used to impact the selection of the appropriate policy to apply. The examples are not intended to limit the scope of the invention. Examples of state information: time of day, failure to make use of a returned address, determination (based on, e.g., behavioral analysis) that the AVM (or the application) has been compromised, determining that the computing device (or a portion thereof) is subject to port knocking, determining that a failure to honor TTL on a returned DNS record, and a result of a measure of guest process using a virtual TPM. Embodiments of the invention, enable a policy to applied to packets issued by an application in a manner that is transparent to the application. Said another way, from the perspective of the application, the application is unaware that a policy is being applied to packets issued by the application.

Figure 6:
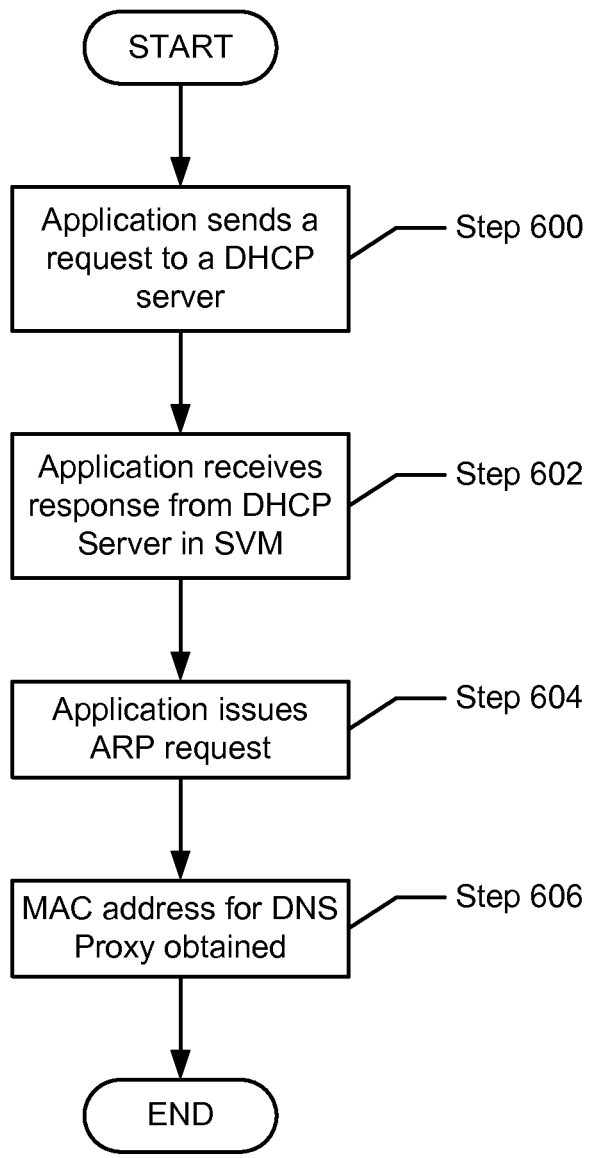
FIGS. 6-7B show flowcharts in accordance with one or more embodiments of the invention.
Figure 7A:
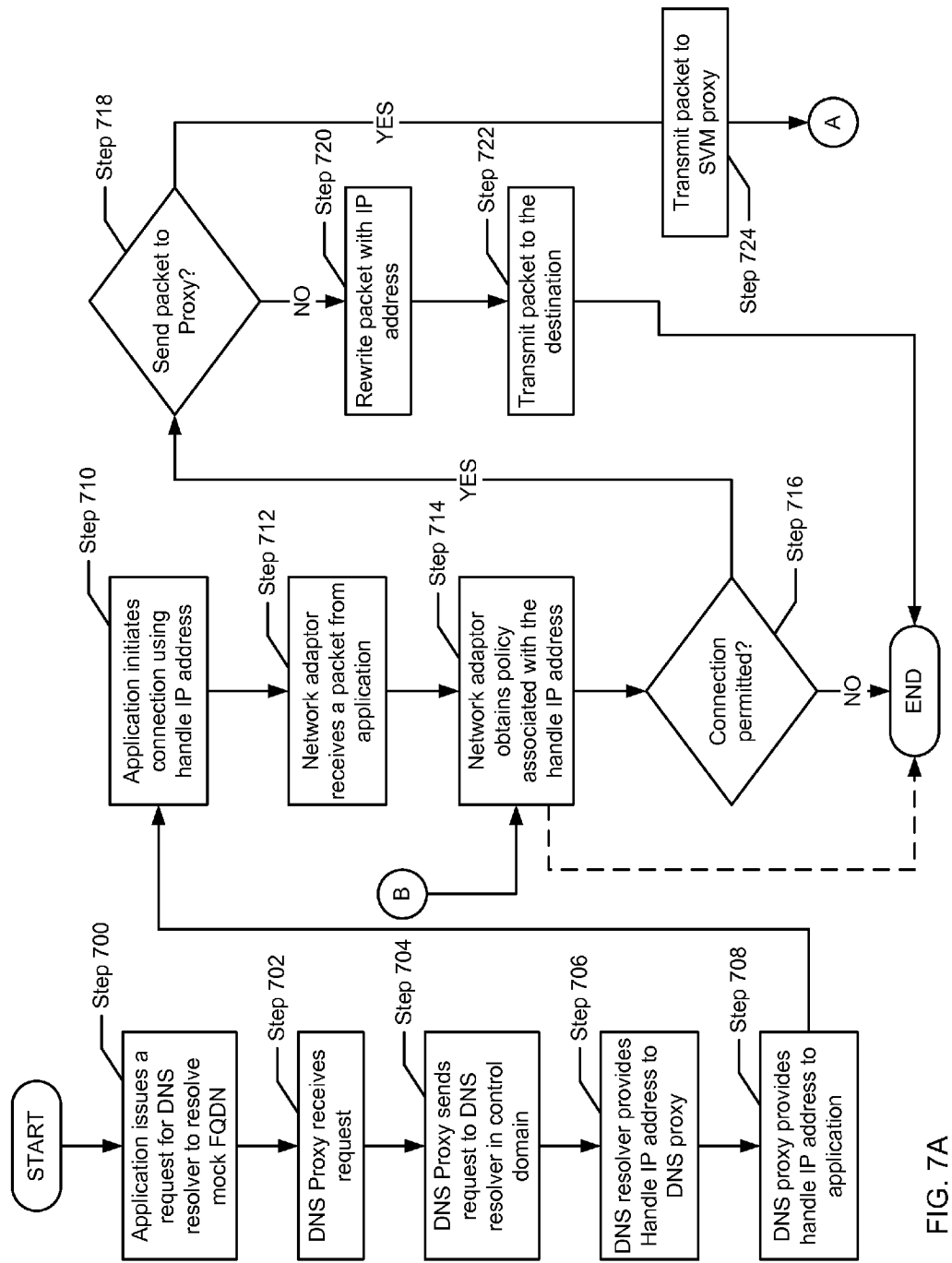
Figure 7B:
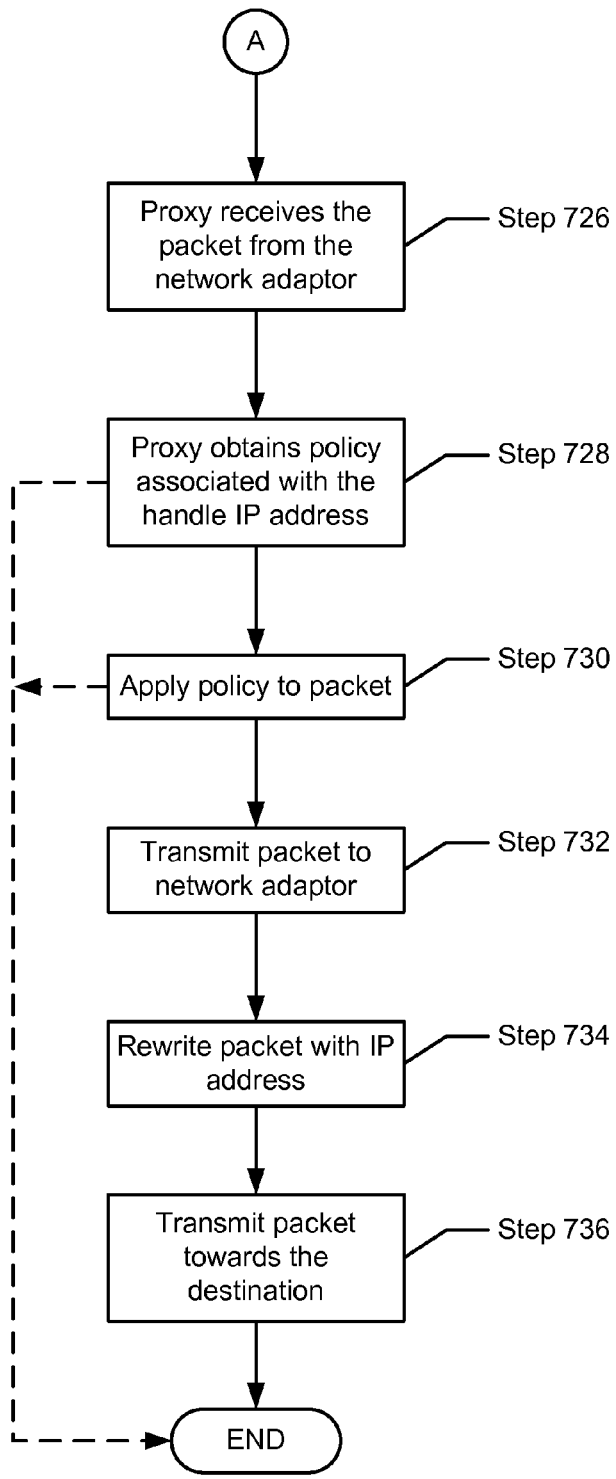

FIGS. 6-7B show flowcharts in accordance with one or more embodiments of the invention.

While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 6-7B may be performed in parallel without departing from the invention.

FIG. 6 shows a method for obtaining information to enable the application to connect to the DNS proxy in accordance with one or more embodiments of the invention.

In step 600, an application sends a request to a DHCP server to obtain the IP address of a DNS resolver.

In step 602, the application receives the IP address of the DNS proxy in response to the request issued in step 600. The application is unaware that the IP address received from the DHCP server is the IP address of a DNS proxy and not the IP address of the actual DNS resolver. Steps 600-602 may be performed by another process in the AVM without departing from the invention. More specifically, the AVM (or a process therein) may use DHCP in order to obtain an IP address for the AVM and the IP address for the DNS resolver.

In step 604, the application issues are ARP request that includes the IP address of the DNS proxy.

In step 606, a media access control (MAC) address for the DNS proxy is received in response to the request in Step 604. In one embodiment of the invention, if the IP address is an IPv6 address then the MAC address of the DNS resolver may be determined using Neighbor Discovery Protocol instead of ARP. In one embodiment of the MAC address may be mock MAC address that is generated by a process on the computing device, by the management service, or a user. The application (and the AVM) is not able to determine that the MAC address is a mock MAC address. Further, this may prevent a would-be-attacker from determining information about applications (or hardware with which the application is interacting) based on the MAC address. Said another way, certain vendors may use certain MAC address ranges/formats, etc. and by using mock MAC addresses a would-be attacker may not be able to ascertain the vendor any vendor information from the mock MAC address.

At this stage, the application includes the information required to initiate a connection to a remote host server.

FIGS. 7A-7B shows a method for processing packets issued by the application in accordance with one or more embodiments of the invention. More specifically, FIGS. 7A-7B describe a method that is performed when an application attempts to connect to (or otherwise communicate with) a remote host server.

In step 700, application issues a request for the DNS resolver to resolve a mock FQDN. More specifically, the application has been pre-configured to use the mock FQDN to access the remote host server. From the perspective of the application, the mock FQDN is the actual FQDN for the remote host server.

In step 702, the DNS proxy in the SVM receives the request from step 700.

In step 704, the DNS proxy sends the request to the DNS resolver in the control domain.

In step 706, the DNS resolver processes the request to obtain a mock IP address. In one embodiment of the invention, there is a pre-configured mapping between mock FQDN and the mock IP address, where the pre-configured mock IP address is associated with a policy (described above). In such cases, the DNS resolver uses the mock FQDN to directly identify the mock IP address. In other instances, the mock IP address is dynamically selected. For example, the mock IP address may be part of a pool of mock IP addresses, where each of the mock IP addresses is associated with a separate policy (e.g., Mock IP address 1—policy 1; mock IP address 2—policy 2, etc.). In such cases, the DNS resolver (or another process in the control domain) identifies the appropriate policy to apply to the packets issued by the application for the remote host server (i.e., for packets that the application is attempting to send to the remote host server). In such scenarios, a policy is selected from the pool of policies, where the selection of policies may be based, at least in part, one of the mock FQDN and/or the state of the computing device (or on the state of at least one component therein). Based on this selection, the corresponding mock IP address is selected.

The DNS resolver may then send this selected mock IP address back to the DNS proxy.

In another embodiment of the invention, there is a pool of policies and a pool of mock IP addresses (i.e., mock IP addresses that are not currently associated with any policies). In such scenarios, a policy is selected from the pool of policies, where the selection of policies may be based, at least in part, on one of the mock FQDN and/or the state of the computing device (or at least one component therein). Once the policy has been selected, a mock IP address from the pool of mock IP addresses is selected and associated with the selected policy. The selected mock IP address is then sent to the DNS proxy.

In one embodiment of the invention, the resolution of the mock FQDN may result in multiple mock IP addresses being generated. In the event that multiple mock IP addresses are generated, only one mock IP address is provided to the DNS proxy while the other mock IP addresses are used in entries in other policy data structures. An example of generating multiple mock IP addresses is described below in FIG. 8.

Continuing with the discussion of step 706, once the mock IP address(es) is determined, one or more entries are created, where each of the entries includes a mock IP address and the corresponding policy. The entries are then distributed to the appropriate components in the computing device, where these components populate their policy data structures. The number of entries generated in step 706 may vary based upon the complexity of the policies being applied to the packets issued by the application. An example of populating various policy data structures is described with request to FIG. 8.

Continuing with the discussion of FIG. 7, in step 708, the mock IP address is provided to the application.

In step 710, the application initiates (or attempts to initiate) a connection to the remote host server using the mock IP address. As part of step 710 at least one packet that includes the mock IP address as the destination IP address is issued by the AVM to the network adaptor.

In step 712, the network adaptor receives the packet from the AVM.

In step 714, the network adaptor obtains the policy associated with the mock IP address, where the mock IP address is extracted from the header of the packet received from the AVM. In one embodiment of the invention, the network adaptor performs a look-up of its policy data structure to identify an entry that includes the mock IP address. If there are no entries in the policy data structure, then the packet is dropped. As discussed above, the policy data structures are only populated with entries that include a given mock IP address after the DNS resolver (or another process in the control domain) identifies the mock IP address to provide to the DNS proxy after receiving a request to resolve the mock FQDN. Accordingly, the network adaptor may only apply the policy to packets issued by applications that have first issued a request to the DNS proxy to resolve the mock FQDN. Once the policy is received, the policy is applied to the packet (see steps 716-724).

In step 716, the first step in processing the packet is to determine whether the connection is permitted. If the result of applying the policy to the packet results in the connection not being permitted, then the process ends. Specifically, the policy may specify various conditions that must be satisfied in order to permit the application to connect to the remote host server. If the conditions are not satisfied, then the packet may be dropped and the process ends. Otherwise, the process proceeds to step 718.

In step 718, the policy may dictate whether the packet must be processed by a proxy or if the packet may be sent to the remote host server without processing by a proxy. If the packet does not require processing by a proxy, the process proceeds to step 720; otherwise, the process proceeds to step 724.

In step 720, the mock IP is replaced with an actual IP address of the remote host server in order to generate a rewritten packet. The actual IP address of the remote host server may be present in the entry associated with the mock IP address (i.e., the policy obtained in step 714).

In step 722, the rewritten packet (which includes the remote host server IP address as the destination IP address) is then transmitted towards the remote host server.

If the policy dictates that the packet is to be processed by a proxy, then in step 724, the packet is transmitted to the appropriate proxy in the SVM. In one embodiment of the invention, the packet is transmitted to the proxy SVM without any modification (or at least without any modification to the destination IP address, i.e., the destination IP address of the packet is the mock IP address). In another embodiment of the invention, the mock IP address in the packet is replaced with a second mock IP address.

In step 726, the proxy (which was identified in the policy obtained in step 714) receives the packet that was transmitted in step 724.

In step 728, the proxy obtains a policy based on the mock IP address that is present in the packet received in step 726. In one embodiment of the invention, the mock IP that is present in the received packet is the mock IP address that was originally provided to the application in step 708. Alternatively, the mock IP address is a second mock IP address, where the original mock IP address was replaced with the second mock IP address by the network adaptor prior to the packet being transmitted to the proxy. In either scenario, the mock IP address (or the second mock IP address) may be included as the destination IP address in the IP header of the packet received in step 726. The mock IP address (or the second mock IP address, if present) is used to identify an entry in a policy data structure that is located within (or accessible to) the proxy.

If an entry with the mock IP address (or the second mock IP address) is not present in the policy data structure, the packet is dropped. As discussed above, the policy data structures are only populated with entries that include a given mock IP address after the DNS resolver (or another process in the control domain) identifies the mock IP address to provide to the DNS proxy after receiving a request to resolve the mock FQDN. Accordingly, the proxy may only apply the policy to received packets after the application (i.e., the application in step 700) has first issued a request to the DNS proxy to resolve the mock FQDN. Once the policy is obtained, the policy is applied to the packet in step 730.

In step 730, the policy is applied to the packet received in step 726. In one embodiment of the invention, the application of the policy to the packet may result in the packet being dropped. Specifically, the policy may specify various conditions that must be satisfied in order to continue processing of the packet received by the proxy. If the conditions are not satisfied, then the packet may be dropped and the process ends. However, if the packet is not dropped then at least a portion of the packet may be modified. The modification to the packet may be in the form of a modification to the header and/or a modification to the payload. The modification of the packet is based on the policy identified in step 730 and the processing performed by the proxy. For example, if the proxy is an HTTPS proxy, then the payload of the packet may be processed in accordance with the Transport Layer Security (TLS) protocol or the Secure Sockets Layer (SSL) protocol. In such scenarios, all or a portion of the payload in the packet received in step 726 may be compressed and/or encrypted. In one embodiment of the invention, the mock IP address (or second mock IP address) in the packet may also be updated to a second mock IP address (or a third mock IP address).

In step 732, the packet that results from step 730 is transmitted to the network adaptor.

In step 734, the network adaptor receives the packet from the proxy and then rewrites at least the mock IP address in the packet to an actual IP address (i.e., an IP address of the remote host server to which the application is attempting to connect). In one embodiment of the invention, the mock IP address that is present in the packet received in step 732 is used to identify the actual IP address. More specifically, the aforementioned mock IP address may be used to locate an entry in the policy data structure in the network adaptor. The identified policy may then include the actual IP address. As discussed above, if not entry is identified, then the packet may be dropped. In step 736, the packet resulting from step 734 is transmitted towards the remote host server.

While the FIGS. 7A and 7B cover the scenario in which the packet may be processed by a single proxy in the SVM, embodiments of the invention may be implemented in which the packet may be processed by multiple proxies in the SVM. In such scenarios, there may be multiple round trips of the packet between the network adaptor and the SVM, where there is a separate round trip for each proxy that is processing the packet. Alternatively, the packet may be sent from the network adaptor to the SVM and then be processed by all appropriate proxies in the SVM, where the packet that finally results from the processing by the proxies in then transmitted back to the network adaptor. In the above embodiments, the network adaptor and the various proxies in the SVM include the necessary entries in their policy data structures.

Figure 8:
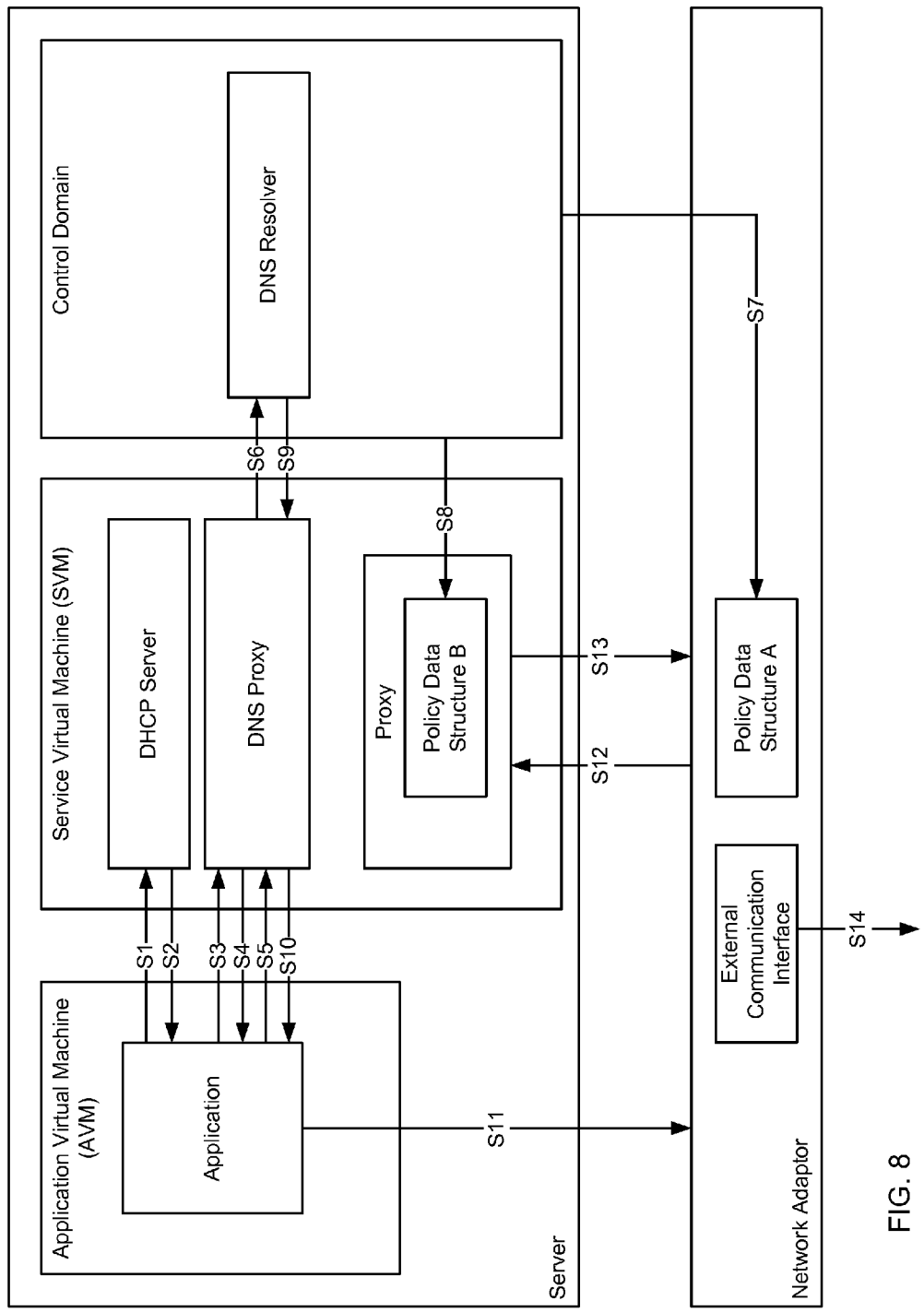
FIG. 8 shows an example in accordance with one or more embodiments of the invention.

FIG. 8 shows an example in accordance with one or more embodiments of the invention. The example is not intended to limit the scope of the invention. For purposes of this example, assume that the application is attempting to reach a remote host server and that the application has been configured to obtain the DNS resolver information from the DHCP server. Further, assume that the application has been provided with the following mock FQDN—computing_device_1.asp.com.

Turning to FIG. 8, at S1 the application sends a request to the DHCP server for the DNS resolver's IP address. In S2, the DHCP server returns 10.1.2.3, which the application considers to be the IP address of the DNS resolver. At S3, the application issues an ARP request using 10.1.2.3 in order to obtain to obtain the MAC address of the DNS resolver. At S4, the DNS proxy responds to the ARP request with its own MAC address (MAC address 1).

At S5, the application issues a request to resolve computing_device_Lasp.com to the DNS resolver using 10.1.2.3 as the destination IP address and MAC address 1 as the destination MAC address. The DNS proxy receives the request and, at S6, forwards the request to the DNS resolver in the control domain.

The receipt of the request by the DNS resolver triggers the following actions: (i) the DNS resolver (or another process in the control domain) determines that the remote host server to which the application is attempting to connect requires connections using HTTPS; (ii) based on (i), the DNS resolver (or another process in the control domain) generates a first entry that includes a first mock IP address (10.2.3.4) and a first policy that specifies that the first mock IP address is to be replaced with a second mock IP address (11.2.3.4) and that the updated packet second mock IP address is to be forwarded to the HTTPS proxy in the SVM; (iii) based on (i), the DNS resolver (or another process in the control domain) generates a second entry that includes the second mock IP address (11.2.3.4) and a second policy that specifies that the payload in the packet with the second mock IP address is to be modified to conform to HTTPS and that the resulting packet is to be forwarded to the network adaptor; and (iii) based on (i), the DNS resolver (or another process in the control domain) generates a third entry that includes the mock IP address (11.2.3.4) and a third policy that specifies that a packet with the second mock IP address is to be written to replace the second mock IP address with an actual IP address of the remote host server (38.114.214.18) and that the resulting packet is to be transmitted towards the remote host server.

At S7, the first and third entries are sent to the network adaptor for storage in policy data structure A and in S8 the second entry is sent to the proxy for storage in policy data structure B. At S9, the DNS resolver provides the mock IP address (10.2.3.4) to the DNS proxy. At S10, the DNS proxy provides the mock IP address (10.2.3.4) to the application.

In S11, the application attempts to initiate an HTTP connection to the remote host server using the mock IP address, 10.2.3.4. As part of this attempt, a packet with a destination IP address of 10.2.3.4 is sent to the network adaptor. Upon receipt of the packet, the network adaptor obtains the mock IP address (10.2.3.4) and attempts to locate an entry in policy data structure A with this mock IP address. The network adaptor ultimately identifies the first entry (as discussed above) and obtains the first policy that is present in the entry. The network adaptor subsequently applies the first policy to the packet. The result of the application of the first policy is an updated packet that includes a mock IP address of 11.2.3.4. Per the first policy, at S12, the updated packet is transmitted to the proxy.

Upon receipt of the updated packet, the proxy obtains the mock IP address (11.2.3.4) and attempts to locate an entry in policy data structure B with this mock IP address. The proxy ultimately identifies the second entry (as discussed above) and obtains the second policy that is present in the entry. The proxy subsequently applies the second policy to the updated packet. The result of the application of the second policy is a modified updated packet that includes a mock IP address of 11.2.3.4 and an updated payload that was generated in accordance with TLS. In this example, updated payload is generating using the original payload that was in the packet issued by the application (in S11) and the appropriate encryption keys that are present in the proxy. The use of the proxy to generate the modified updated packet is completely transparent to the application. Accordingly, the application does not have any information about or access to the encryption keys used to generate the updated payload.

Continuing with the example, per the second policy, at S13, the modified updated packet is transmitted to the network adaptor. Upon receipt of the modified updated packet, the network adaptor obtains the mock IP address (11.2.3.4) and attempts to locate an entry in policy data structure A with this mock IP address. The network adaptor ultimately identifies the third entry (as discussed above) and obtains the third policy that is present in the entry. The network adaptor subsequently applies the third policy to the modified updated packet. The result of the application of the third policy is a final packet that includes an actual IP address of the remote host server, 38.114.214.18. In this example, the final packet is generated by replacing the mock IP address in the modified updated packet with the actual IP address of the remote host server. Per the third policy, at S14, the final packet is transmitted towards the remote host server.

Figure 9:
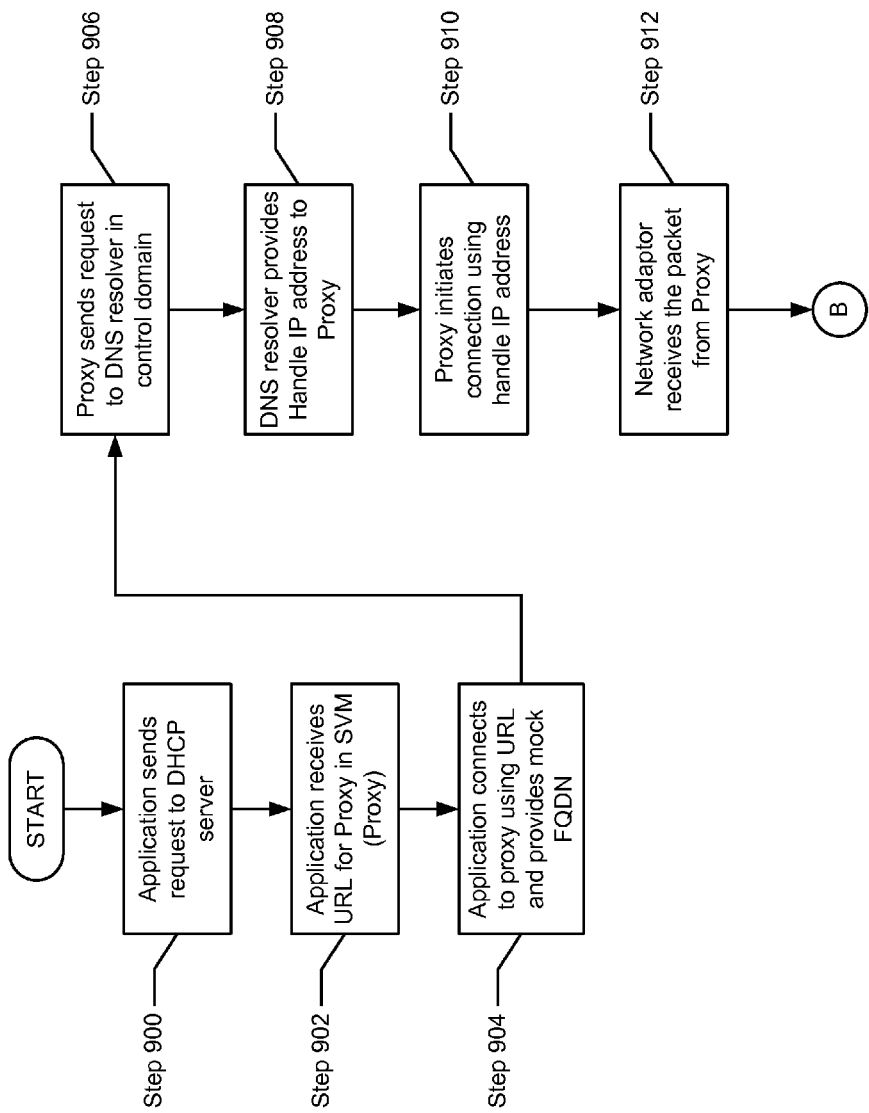
FIG. 9 shows a flowchart in accordance with one or more embodiments of the invention.

FIG. 9 shows a flowchart for connecting to a proxy in the SVM in accordance with one or more embodiments of the invention. More specifically, in the embodiment shown in FIG. 9, the application's connection to the proxy is performed in a non-transparent manner (i.e., the application is aware that it is communicating with the proxy).

While the various steps in the flowcharts are presented and described sequentially, one of ordinary skill will appreciate that some or all of these steps may be executed in different orders, may be combined or omitted, and some or all of the steps may be executed in parallel.

Turning to FIG. 9, in step 900, the application sends a request to a DHCP server (e.g., a DHCPINFORM query).

In step 902, in response to the request, the application receives a response from the DHCP server that include a URL for the proxy in the SVM.

In step 904, application directly connects to the proxy using the URL received in step 902. Once connected, the application provides the mock FQDN to the proxy. The application provides the mock FQDN to the proxy along with a request for the proxy to connect to the remote host server corresponding to the mock FQDN.

In step 906, the proxy sends the request to the DNS resolver in the control domain.

In step 908, the DNS resolver processes the request to obtain a mock IP address. Step 908 may be performed in a manner that is the same or substantially similar to step 708 in FIG. 7A.

In step 910, the proxy initiates (or attempts to initiate) a connection to the remote host server using the mock IP address. As part of step 910 at least one packet that includes the mock IP address as the destination IP address is issued by the SVM to the network adaptor.

In step 912, the network adaptor receives the packet from the SVM. At this stage, the packet is processed in accordance with FIGS. 7A and 7B.

Figure 10:
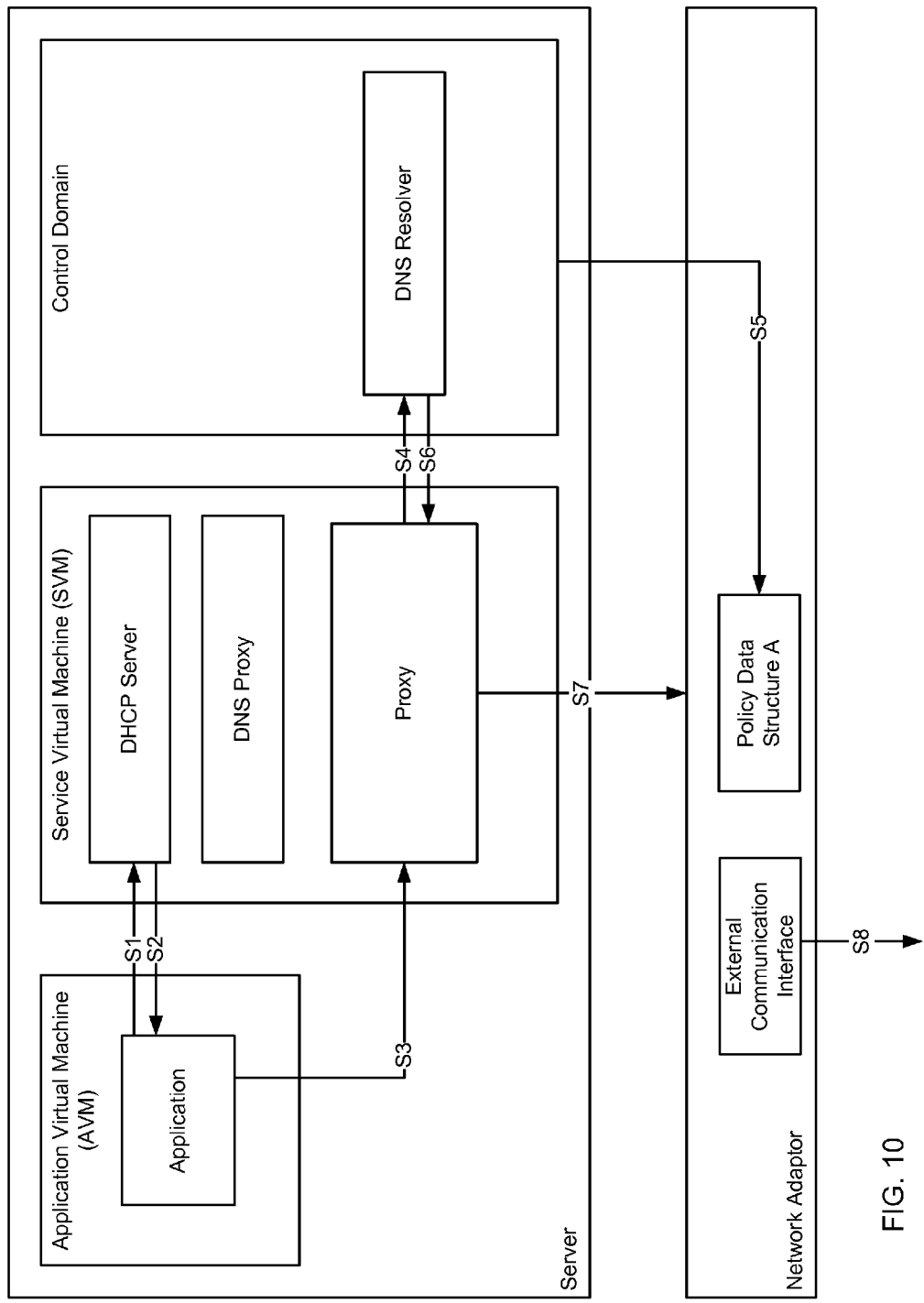
FIG. 10 shows an example in accordance with one or more embodiments of the invention.

FIG. 10 shows an example in accordance with one or more embodiments of the invention. The example is not intended to limit the scope of the invention. For purposes of this example, assume that the application is attempting to reach a remote host server and that the application has been configured to use WPAD to obtain the URL for the proxy from the DHCP server. Further, assume that the application has been provided with the following mock FQDN— computing_device_1.asp.com and that the proxy is an HTTPS proxy.

Turning to FIG. 10, in S1 the application issues a DHCPINFORM query to the DHCP server in the SVM. At S2, the DHCP server sends a response back to the application that includes the URL of a proxy in the SVM. At S3, the application connects to the proxy using HTTP and the URL obtained from the DHCP server. Once a connection has been established the application sends the proxy a request to connect to the remote host server using the mock FQDN. This request includes at least one packet from the application.

At S4, the proxy sends a request for the DNS resolver to resolve the mock FQDN.

The receipt of the request by the DNS resolver triggers the following action: the DNS resolver (or another process in the control domain) generates an entry that includes the mock IP address (10.2.3.4) and a policy that specifies that a packet with the mock IP address is to be rewritten to replace the mock IP address with an actual IP address of the remote host server (38.114.214.18) and that the resulting packet is to be transmitted towards the remote host server.

At S5, the entry is sent to the network adaptor for storage in policy data structure A. At S6, the DNS resolver sends the mock IP address (10.2.3.4) to the proxy.

At S7, the proxy attempts to initiate an HTTPS connection with the remote host server using the mock IP address (10.2.3.4). As part of this attempt, at least one packet is sent to the network adaptor from the proxy. The at least one packet includes a payload that conforms to the TLS standard (where the payload in the packet was generated based on the payload in the packet received by the application in S3).

Upon receipt of the packet from the proxy, the network adaptor obtains the mock IP address (10.2.3.4) and attempts to locate an entry in policy data structure A with this mock IP address. The network adaptor ultimately identifies the entry (as discussed above) and obtains the policy that is present in the entry. The network adaptor subsequently applies the policy to the packet. The result of the application of the policy is a final packet that includes an actual IP address of the remote host server, 38.114.214.18. In this example, the final packet is generated by replacing the mock IP address in the packet with the actual IP address of the remote host server. Per the policy, at S18, the final packet is transmitted towards the remote host server.

Embodiments of the invention may be implemented using mock IP address and non-mock IP addresses (also referred to as IP addresses or actual IP addresses) that conform to either IPv4 or IPv6.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing network access for applications, comprising:
   issuing, by an application executing in an application virtual machine (AVM), a request for a domain name service (DNS) resolver to resolve a mock fully qualified domain name (FQDN);
   processing, by a DNS proxy executing in a service virtual machine (SVM), the request in order to obtain a mock Internet Protocol (IP) address;
   providing, by the DNS proxy, the mock IP address to the application;
   initiating, by the application, a connection to a remote host server using the mock IP address by issuing a packet comprising the mock IP address;
   receiving, by a network adaptor, the packet;
   obtaining, by the network adaptor, a first policy associated with the mock IP address; and
   processing, by the network adaptor, the packet based on the first policy,
   wherein the AVM, the SVM and the control domain execute on a computing device,
   wherein the computing device comprises the network adaptor.

2. The method of claim 1, wherein processing the packet based on the first policy comprises:
   replacing the mock IP address in the packet with an IP address to obtain an updated packet; and transmitting the updated packet towards the remote host server.

3. The method of claim 1, wherein obtaining the first policy comprises:
performing a look-up in a policy data structure using the mock IP address, wherein the policy data structure is located in the network adaptor.

4. The method of claim 1, wherein processing the request in order to obtain the mock IP address comprises:
providing, by the DNS proxy, the mock FQDN to the DNS resolver in a control domain on the computing device;
determining, by the DNS resolver, the mock IP address;
providing, by the DNS resolver, the mock IP address to the DNS proxy.

5. The method of claim 4, wherein the policy data structure is only populated with an entry comprising the mock IP address after the DNS resolver determines the mock IP address.

6. The method of claim 5, wherein determining the mock IP address comprises using the mock FQDN and a runtime state of at least one selected from a group consisting of the application, the SVM, and the network adaptor.

7. The method of claim 5, wherein the mock IP address is selected from a pool of mock IP addresses that are available when the DNS resolver determines the mock IP address.

8. The method of claim 1, wherein the request to the DNS resolver comprises an IP address of a DNS Proxy, wherein the IP address of the DNS proxy is obtained from a Dynamic Host Configuration Protocol (DHCP) server executing in the SVM.

9. The method of claim 1, wherein processing the packet based on the first policy comprises:
replacing the mock IP address in the packet with a second mock IP address to obtain an updated packet; and
transmitting the updated packet towards a proxy in the SVM.

10. The method of claim 9, wherein the proxy is one selected from a group consisting of a Secure Shell (SSH) proxy and lightweight directory access protocol (LDAP).

11. The method of claim 9, further comprising:
obtaining, by the proxy, a second policy associated with the second mock IP address;
processing, by the proxy, the updated packet based on the second policy to obtain a second updated packet;
transmitting the second updated packet to the network adaptor; and
transmitting, by the network adaptor, the second updated packet towards the remote host server.

12. The method of claim 11, wherein processing by the proxy comprises modifying a payload of the updated packet.

13. The method of claim 12, wherein modifying the payload comprises encrypting the payload.

14. The method of claim 9, further comprising:
obtaining, by the proxy, a second policy associated with the second mock IP address;
processing, by the proxy, the updated packet based on the second policy to obtain a second updated packet;
transmitting the second updated packet to the network adaptor, wherein the second updated packet comprises the second mock IP address;
receiving the second updated packet by the network adaptor;
replacing the second mock IP address in the second updated packet with an IP address to obtain a third updated packet; and
transmitting the third updated packet towards the remote host server.

15. The method of claim 1, wherein the connection is Hypertext Transfer Protocol (HTTP) connection.

16. A method for managing network access for applications, comprising:
issuing, by the application executing in an application virtual machine (AVM), a request to a Dynamic Host Configuration Protocol (DHCP) server;
receiving, by the application, in response to the request a universal resource locator (URL) for a proxy executing in a service virtual machine (SVM);
connecting, by the application, to the proxy using the URL;
after the connection has been established, providing a mock fully qualified domain name (FQDN) to the proxy;
providing, by the proxy, the FQDN to a domain name service (DNS) resolver in a control domain;
receiving, from the DNS resolver, a mock Internet Protocol (IP) address;
initiating, by the proxy, a connection to a remote host server using the mock IP address by issuing a packet comprising the mock IP address;
receiving, by a network adaptor, the packet;
obtaining, by the network adaptor, a first policy associated with the mock IP address; and
processing, by the network adaptor, the packet based on the first policy,
wherein the AVM, the SVM and the control domain execute on a computing device,
wherein the computing device comprises the network adaptor.

17. The method of claim 16, wherein the application connects to the proxy using Hypertext Transfer Protocol (HTTP) connection.

18. The method of claim 17, wherein the proxy initiates the connection with the remote host server using HTTP security (HTTPS).

19. The method of claim 16, wherein the DHCP server implements web proxy autodiscovery protocol (WPAD).

20. The method of claim 16, wherein the policy data structure is only populated with an entry comprising the mock IP address after the DNS resolver processes the request in order to provide the mock IP address to the proxy.

* * * * *